(12) United States Patent
Shibata et al.

(10) Patent No.: US 10,551,760 B1
(45) Date of Patent: Feb. 4, 2020

(54) IMAGE RECORDING COMPOSITION, ELECTROSTATIC IMAGE DEVELOPING TONER, AND IMAGE FORMING METHOD

(71) Applicant: Konica Minolta, Inc., Tokyo (JP)

(72) Inventors: Toyoko Shibata, Tokyo (JP); Seijiro Takahashi, Kokubunji (JP); Haruo Horiguchi, Koganei (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 16/429,494

(22) Filed: Jun. 3, 2019

(30) Foreign Application Priority Data

Aug. 10, 2018 (JP) .................. 2018-151499

(51) Int. Cl.
| | |
|---|---|
| *G03G 9/097* | (2006.01) |
| *G03G 9/087* | (2006.01) |
| *B41J 11/00* | (2006.01) |
| *C09D 11/38* | (2014.01) |
| *C09D 11/101* | (2014.01) |
| *G03G 15/20* | (2006.01) |

(52) U.S. Cl.
CPC ........ *G03G 9/09733* (2013.01); *B41J 11/002* (2013.01); *C09D 11/101* (2013.01); *C09D 11/38* (2013.01); *G03G 9/08711* (2013.01); *G03G 9/08755* (2013.01); *G03G 15/20* (2013.01)

(58) Field of Classification Search
CPC ........... G03G 9/09733; G03G 9/08711; G03G 15/20; G03G 9/08755; B41J 11/002; C09D 11/101; C09D 11/38
See application file for complete search history.

(56) References Cited

FOREIGN PATENT DOCUMENTS

| JP | 2014191077 A | 10/2014 |
|---|---|---|
| JP | 2014191078 A | 10/2014 |
| JP | 2019-101356 | * 6/2019 |

* cited by examiner

*Primary Examiner* — Thorl Chea
(74) *Attorney, Agent, or Firm* — Lucas & Mercanti, LLP

(57) ABSTRACT

Provided is an image recording composition used for an electrostatic image developing toner or an ink-jet ink, containing a photoisomerization compound which is a stilbene derivative having a structure represented by Formula (1),

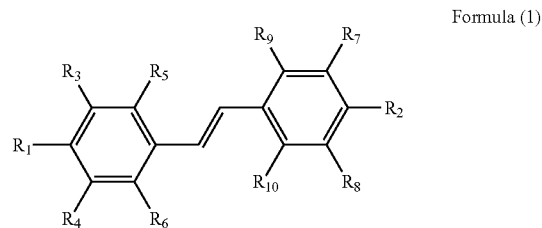

Formula (1)

wherein $R_1$ represents an electron donating group; $R_2$ represents an electron withdrawing group; $R_3$ to $R_{10}$ each independently represent a hydrogen atom or an alkyl group which may have a branch, provided that at least one of $R_3$ to $R_{10}$ represents an alkyl group which may have a branch.

15 Claims, 2 Drawing Sheets

IMAGE RECORDING COMPOSITION, ELECTROSTATIC IMAGE DEVELOPING TONER, AND IMAGE FORMING METHOD

Japanese Patent Application No. 2018-151499, filed on Aug. 10, 2018 with Japan Patent Office, is incorporated herein by reference in its entirety.

TECHNOLOGICAL FIELD

The present invention relates to an image recording composition, an electrostatic image developing toner, and an image forming method. More particularly, the present invention relates to an image recording composition capable of imparting a favorable fixing speed by being incorporated into an electrostatic image developing toner or an ink-jet ink, an electrostatic image developing toner, and an image forming method.

BACKGROUND

While energy saving and compatible media are being expanded, heat fixing is the main method for fixing electrostatic image developing toner or ink-jet ink to a recording medium. However, for the purpose of improving operability, energy saving and expansion of compatible media types, there have been proposed systems in which fixing of the image is performed with an external stimulus different from heat. Among them, a light fixing system that is relatively compatible with the electrophotographic process has attracted attention, and several light-softened developers (light melting toners) have been reported.

The light melting toners described in Patent Document 1 (JP-A 2014-191077) and Patent Document 2 (JP-A 2014-191078) are characterized in that they contain a material (light phase transition material) that absorbs light and causes a phase transition from solid to liquid. However, there are very few reported examples of such light phase transition materials, the mechanism of the light phase transition is not sufficiently clarified, and the light softening mechanism of the light melting toner is also unclarified.

Further, the light phase transition material used in the toner described in Patent Document 1 and Patent Document 2 is an azobenzene derivative. It is known that an azobenzene derivative is a material that absorbs light and softens from the solid state (light phase transition). In addition, it is believed that the light phase transition of the azobenzene compound is caused by the crystal structure being broken by cis-trans isomerization.

However, the light melting toner reported at present has a problem that the productivity is low because the softening rate necessary for fixing is not sufficient.

SUMMARY

The present invention has been made in view of the above problems and circumstances. An object of the present invention is to provide an image recording composition capable of imparting a favorable fixing speed by being incorporated into an electrostatic image developing toner or an ink-jet ink, an electrostatic image developing toner, and an image forming method.

An image recording composition reflecting an aspect of the present invention to achieve the above-described object is an image recording composition used for an electrostatic image developing toner or an ink-jet ink, comprising a photoisomerization compound which is a stilbene derivative having a structure represented by Formula (1).

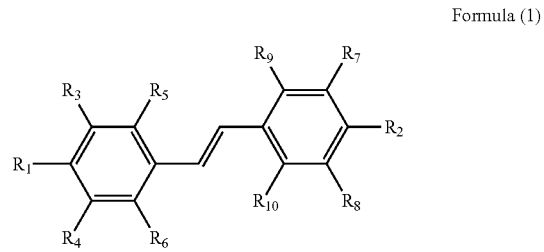

Formula (1)

In Formula (1), $R_1$ represents an electron donating group; $R_2$ represents an electron withdrawing group; $R_3$ to $R_{10}$ each independently represent a hydrogen atom or an alkyl group which may have a branch, provided that at least one of $R_3$ to $R_{10}$ represents an alkyl group which may have a branch.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Figure 1:
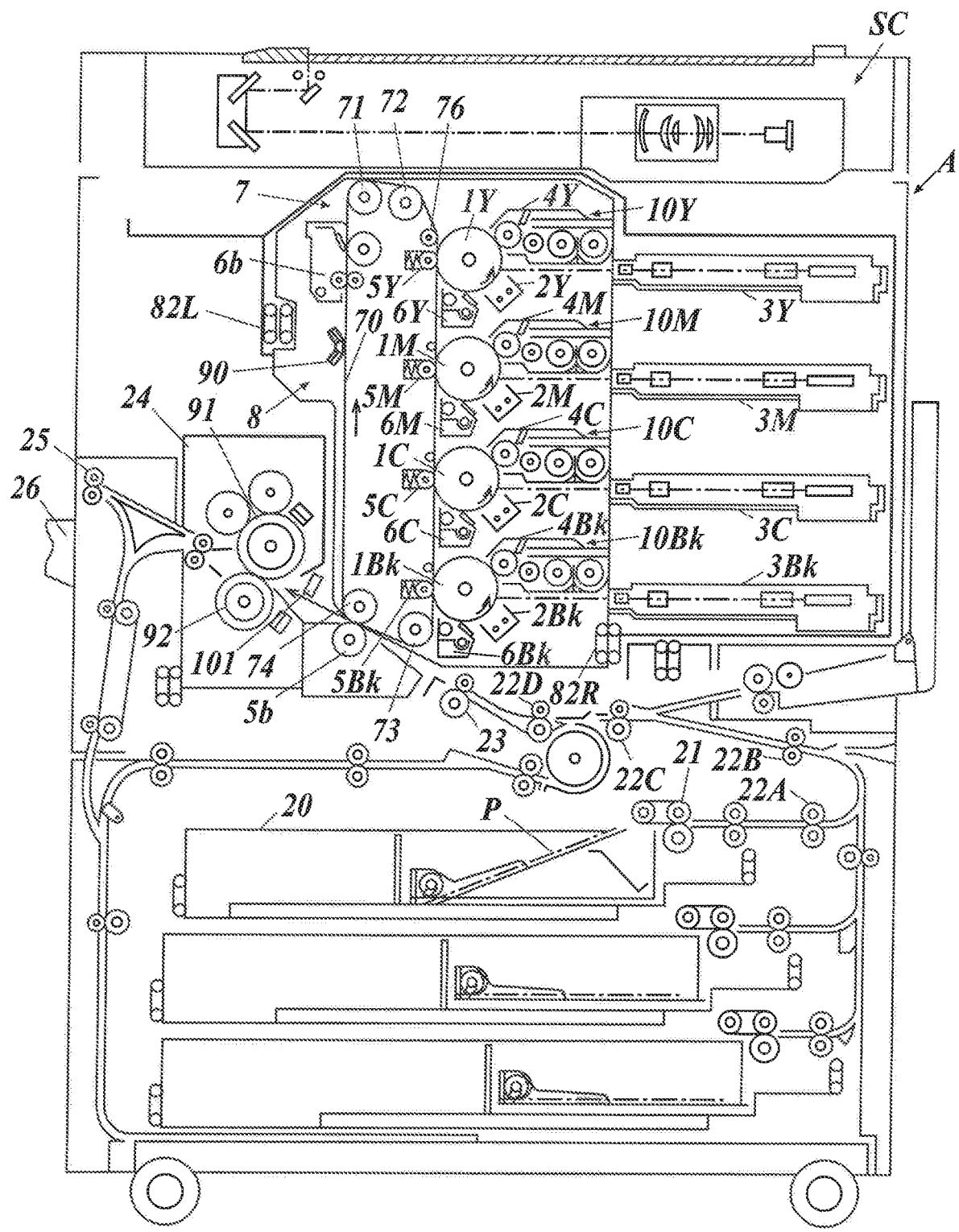
FIG. 1 is a schematic view illustrating an example of an image forming apparatus according to the present invention.

Hereinafter, one or more embodiments of the present invention will be described with reference to the drawings. However, the scope of the invention is not limited to the disclosed embodiments.

The image recording composition of the present invention is a composition for image recording that may be used for an electrostatic image developing toner or an ink-jet ink. It contains a photoisomerization compound, and the photoisomerization compound is a stilbene derivative having a structure represented by Formula (1). This feature is a technical feature common or corresponding to the following embodiments.

According to the present invention, it is possible to provide an image recording composition which has a good softening rate by incorporating in an electrostatic image developing toner or an ink-jet ink, an electrostatic image developing toner, and an image forming method. The expression mechanism or the action mechanism of effects of the present invention is not clear but it is presumed as follows.

The photoisomerization reaction of the stilbene derivative is considered to occur when the molecule absorbs photons to become an electronic excited state with high energy and twist around a double bond. From this, it is assumed to be able to increase a softening rate by light irradiation and to improve the fixability of the image with smaller energy by introducing a substituent at a meta or an ortho position of the benzene ring bonded to the double bond to create a structural defect.

In the present invention, by introducing an alkyl group which may have a branch into at least one of $R_3$ to $R_{10}$ in Formula (1), the crystal structure of the stilbene derivative is broken and a structural defect is generated to obtain more photoisomerism. As a result, it is considered that the fixing speed of the image recording composition having the structure represented by Formula (1) may be increased. In addition, it is considered that the fixing speed is improved by promoting the deformation of the toner by improving the softening rate and improving the penetration and adhesion to the paper.

In an embodiment of the present invention, it is preferable that $R_1$ in Formula (1) represents an alkoxy group having 1 to 12 carbon atoms, from the viewpoint of compatibility with the binder resin. More preferably, it represents an alkoxy group having 2 to 8 carbon atoms.

In an embodiment of the present invention, from the viewpoint of compatibility with the binder resin contained in the electrostatic image developing toner, it is preferable that $R_2$ in Formula (1) represents an alkoxycarbonyl group or an acyl group, and a number of carbon atoms in the alkyl chain contained therein is preferably 1 to 12. More preferably, the number of carbon atoms in the alkyl chain is 4 to 8.

More preferably, $R_2$ is an alkoxycarbonyl group having 4 to 8 carbon atoms in the alkyl chain.

In an embodiment of the present invention, from the viewpoint of securing a free volume necessary for cis-trans isomerization, it is preferable that at least one of $R_3$ to $R_{10}$ in Formula (1) represents an alkyl group having 1 to 4 carbon atoms which may have a branch.

In an embodiment of the present invention, from the viewpoint of obtaining the effects of the present invention more effectively, it is preferable that the maximum light absorption wavelength of the stilbene derivative is in the range of 320 to 410 nm in order to make the light absorption efficiency the highest using a versatile 350 to 405 nm UV light source. The electrostatic image developing toner of the present invention is a toner for electrostatic image development containing toner particles, and the image recording composition of the present invention is contained in the toner particles.

In an embodiment of the present invention, from the viewpoint of obtaining the effects of the present invention more effectively, it is preferable that the toner particles contain a binder resin. In an embodiment of the present invention, from the viewpoint of obtaining the effects of the present invention more effectively, it is preferable that the binder resin contains a styrene-acrylic resin or a polyester resin. In an embodiment of the present invention, it is preferable that the toner particles contain a colorant.

The image forming method of the present invention is an image forming method comprising the step of fixing an image by light irradiation. This method contains a step of forming an image on a recording medium using an electrostatic image developing toner or an ink-jet ink, each containing the image recording composition described in any one of the embodiments 1 to 8; and fixing the image formed on the recording medium by irradiating the image with light having a wavelength in the range of 320 to 410 nm.

In an embodiment of the present invention, from the viewpoint of further improving the fixability to the recording medium, it is preferable to further include a step of pressing the recording medium on which the image is formed with a pressing member after the image is irradiated with the light. Further, the temperature of the pressure member is preferably in the range of 30 to 100° C.

The present invention and the constitution elements thereof, as well as configurations and embodiments, will be detailed in the following. In the present description, when two figures are used to indicate a range of value before and after "to", these figures are included in the range as a lowest limit value and an upper limit value.

[Image Recording Composition]

The image recording composition of the present invention is a composition for image recording that may be used for an electrostatic image developing toner or ink-jet ink, and contains a photoisomerization compound, wherein the photoisomerization compound is a stilbene derivative having a structure represented by Formula (1).

As described above, the azobenzene derivative is a material that absorbs light and softens (light phase transition) from the solid state, and this light phase transition is considered to be caused by the crystal structure being broken by cis-trans isomerization. Therefore, the present inventors focused on stilbene derivatives having a structure in which an aromatic ring is connected by a double bond as a compound having a structure similar to that of the azobenzene compound. It is known that stilbene derivatives also undergo cis-trans isomerization by absorbing light, resulting in a significant change in crystal structure.

The stilbene derivative is colorless and it is considered to be able to achieve desired color reproduction even when it is mixed with a colorant when added to a toner. Further, by using LED light with a wavelength of around 300 to 400 nm, it is possible to use the light source of the shorter wavelength side inexpensively. As a result of examining a stilbene derivative having absorption in this wavelength range, in order to increase absorption intensity in this wavelength range, the following compound was found in the present invention. In the present invention, an alkoxy group which is an electron donating group is introduced to the para position of two benzene rings of the stilbene derivative, and an alkoxycarbonyl group or an acyl group which is an electron withdrawing group is introduced to the other side. By this, it has been found that an almost colorless stilbene derivative can be provided which has a high extinction coefficient peak at a wavelength around 300 to 400 nm.

In the present invention, by introducing an alkyl group which may have a branch into at least one of $R_3$ to $R_{10}$ in Formula (1), the crystal structure of the stilbene derivative is broken to make a structural defect. Thereby, it is believed that photoisomerization is more likely to occur.

Further, the compatibility with the binder resin may be increased by introducing a long chain alkyl group into at least one of $R_1$ and $R_2$ in Formula (1).

Further, in order to soften the photoisomerization reaction of the stilbene derivative at a high rate, a substituent is introduced at the meta or the ortho position of the benzene ring bonded to the double bond to create a structural defect. By this, it is considered that the softening rate by the light irradiation is further improved, and the fixing property of the image may be improved with smaller energy.

Moreover, it was found that light resistance is improved by adding the stilbene compound according to the present invention. In the test in which strong light is irradiated, when the stilbene compound of the present invention is not added, the colorant contained in the toner causes photodegradation to induce discoloration or color fading.

The light resistance is improved by the addition of the stilbene compound according to the present invention, because the stilbene compound according to the present invention has the function of suppressing the deterioration of the colorant by the light deterioration of itself before the deterioration of the colorant. Further, even if the stilbene compound is photodegraded, it is presumed that there is no discoloration of the toner because it is not discolored.

[Stilbene Derivative Represented by Formula (1)]

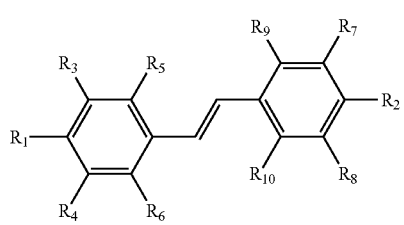

Formula (1)

In Formula (1), $R_1$ represents an electron donating group; $R_2$ represents an electron withdrawing group; $R_3$ to $R_{10}$ each independently represent a hydrogen atom or an alkyl group which may have a branch, provided that at least one of $R_3$ to $R_{10}$ represents an alkyl group which may have a branch.

In Formula (1), $R_1$ represents an electron donating group. As the electron donating group, an alkoxy group is preferable. The number of carbon atoms of the alkyl chain contained in the alkoxy group is preferably 1 to 12 from the viewpoint of compatibility with the binder resin. When the number of carbon atoms is further increased, the melting point is lowered. Therefore, the number of carbon atoms is more preferably 2 to 8.

$R_2$ represents an electron withdrawing group. As the electron withdrawing group, an alkoxycarbonyl group or an acyl group is preferable. Examples of the acyl group include an alkylcarbonyl group, an arylcarbonyl group, and a heteroarylcarbonyl group. Among them, an alkylcarbonyl group is preferable. The number of carbon atoms of the alkyl chain contained in the alkoxy group is preferably 1 to 12 from the viewpoint of compatibility with the binder resin. When the number of carbon atoms is further increased, the melting point is lowered. Therefore, the number of carbon atoms is more preferably 4 to 8.

In Formula (1), $R_3$ to $R_{10}$ each independently represent a hydrogen atom or an alkyl group which may have a branch, provided that at least one of $R_3$ to $R_{10}$ represents an alkyl group which may have a branch. From the viewpoint of securing the free volume necessary for cis-trans isomerization, the alkyl group which may have a branch represented by $R_3$ to $R_{10}$ preferably has an alkyl group of 1 to 4 carbon atoms, more preferably, has an alkyl group of 1 to 2 carbon atoms.

The number of the alkyl group which may have a branch represented by $R_3$ to $R_{10}$ is preferably 1 to 4. The melting point tends to be lowered by the increase of substituents, and from the viewpoint of the heat resistant storage of the toner, the number of substituents is more preferably 1 to 2.

Further, from the viewpoint of obtaining the effects of the present invention more effectively, the maximum light absorption wavelength of the stilbene derivative is preferably in the range of 320 to 410 nm in order to maximize the light absorption efficiency using a versatile 350 to 405 nm UV light source.

Exemplary compounds of the stilbene derivative according to the invention are indicated in the following Table I. Table I indicates examples of hydrogen atoms or substituents introduced into $R_1$ to $R_{10}$ of the above-described Formula (1). However, the stilbene derivatives according to the present invention are not limited to the exemplary examples indicated in Table I.

In the present invention, a "maximum light absorption wavelength" is calculated using software for molecular orbital calculation. More specifically, Gaussian 09 manufactured by Gaussian, USA (Revision C. 01, M. J. Frisch, et al., Gaussian, Inc., 2010) is used as a software for molecular orbital calculation using B3LYP as a functional and 6-31 G (d) as a basis function. The software is not particularly limited, and any one may be used to obtain in the same way.

TABLE I

| Compound No. | $R_1$ | $R_2$ | $R_3$ | $R_4$ | $R_5$ | $R_6$ | $R_7$ | $R_8$ | $R_9$ | $R_{10}$ | Maximum absorption Wavelength (nm) |
|---|---|---|---|---|---|---|---|---|---|---|---|
| 1 | $OCH_3$ | $COC_2H_5$ | $CH_3$ | H | H | H | H | H | H | H | 369 |
| 2 | $OCH_3$ | $COOC_5H_{11}$ | $C_2H_5$ | $C_2H_5$ | H | H | H | H | H | H | 345 |
| 3 | $OC_2H_5$ | $COC_6H_{13}$ | H | H | H | H | $CH_3$ | $CH_3$ | H | H | 342 |
| 4 | $OC_2H_5$ | $COC_2H_5$ | $CH(CH_3)_2$ | H | H | H | H | H | H | H | 346 |
| 5 | $OC_2H_5$ | $COOC_4H_9$ | H | H | H | H | H | $C_2C_5$ | H | H | 354 |
| 6 | $OC_3H_7$ | $COC_4H_9$ | $CH_3$ | H | H | H | H | H | H | H | 366 |
| 7 | $OC_3H_7$ | $COC_3H_7$ | H | H | H | H | $C_3C_7$ | H | H | H | 366 |
| 8 | $OC_3H_7$ | $COOC_4H_9$ | $C_2C_5$ | H | H | H | H | H | H | H | 345 |
| 9 | $OC_3H_7$ | $COOC_6H_{13}$ | H | H | H | H | $C(CH_3)_3$ | H | H | H | 347 |
| 10 | $OC_4H_9$ | $COC_4H_9$ | $C_3C_7$ | H | H | H | H | H | H | H | 356 |
| 11 | $OC_4H_9$ | $COC_6H_{13}$ | H | H | H | H | H | $CH_3$ | H | H | 345 |
| 12 | $OC_4H_9$ | $COOC_4H_9$ | $C_2C_5$ | H | H | H | H | H | H | H | 352 |
| 13 | $OC_4H_9$ | $COOC_8H_{17}$ | H | H | H | H | H | $C_4C_9$ | H | H | 363 |
| 14 | $OC_5H_{11}$ | $COC_6H_{13}$ | H | H | H | H | $CH_3$ | H | H | H | 347 |
| 15 | $OC_5H_{11}$ | $COOCH_3$ | $C_4C_9$ | H | H | H | $C_4C_9$ | H | H | H | 359 |
| 16 | $OC_5H_{11}$ | $COOC_4H_9$ | $C_2C_5$ | H | H | H | H | H | H | H | 356 |
| 17 | $OC_6H_{13}$ | $COC_4H_9$ | $CH_3$ | H | H | H | H | H | H | H | 364 |
| 18 | $OC_6H_{13}$ | $COC_2H_5$ | H | H | H | H | $C_2C_5$ | H | H | H | 348 |
| 19 | $OC_6H_{13}$ | $COOC_8H_{17}$ | H | H | H | H | $CH_3$ | $CH_3$ | H | H | 348 |
| 20 | $OC_6H_{13}$ | $COOC_6H_{13}$ | $CH_3$ | H | H | H | H | H | H | H | 358 |
| 21 | $OC_7H_{15}$ | $COC_2H_5$ | H | H | H | H | $C_4C_9$ | H | H | H | 354 |
| 22 | $OC_7H_{15}$ | $COOC_4H_9$ | $CH_3$ | H | H | H | H | H | H | H | 359 |
| 23 | $OC_8H_{17}$ | $COCH_3$ | $C_4C_9$ | H | H | H | H | H | H | H | 361 |
| 24 | $OC_8H_{17}$ | $COOC_5H_{11}$ | H | H | H | H | $CH_3$ | H | H | H | 354 |
| 25 | $OC_8H_{17}$ | $COOC_8H_{17}$ | $CH_3$ | H | H | H | H | H | H | H | 358 |
| 26 | $OC_9H_{19}$ | $COC_{12}H_{25}$ | $CH_3$ | H | H | $CH_3$ | $CH_3$ | H | H | H | 369 |
| 27 | $OC_9H_{19}$ | $COOC_{12}H_{25}$ | $CH_3$ | $CH_3$ | H | H | H | H | H | H | 347 |

TABLE I-continued

| Compound No. | $R_1$ | $R_2$ | $R_3$ | $R_4$ | $R_5$ | $R_6$ | $R_7$ | $R_8$ | $R_9$ | $R_{10}$ | Maximum absorption Wavelength (nm) |
|---|---|---|---|---|---|---|---|---|---|---|---|
| 28 | $OC_{10}H_{21}$ | $COC_6H_{13}$ | H | H | H | H | $CH_3$ | $CH_3$ | H | H | 343 |
| 29 | $OC_{10}H_{21}$ | $COOCH_3$ | $C_4C_9$ | $C_4C_9$ | H | H | H | H | H | H | 347 |
| 30 | $OC_{11}H_{23}$ | $COC_5H_{11}$ | H | H | H | H | H | $CH_3$ | H | H | 363 |
| 31 | $OC_{11}H_{23}$ | $COOC_5H_{11}$ | $CH_3$ | H | H | H | H | H | H | H | 359 |
| 32 | $OC_{12}H_{25}$ | $COC_3H_7$ | $CH_3$ | H | H | H | H | H | H | H | 356 |
| 33 | $OC_{12}H_{25}$ | $COOC_6H_{13}$ | $CH_3$ | H | H | H | H | H | H | H | 359 |

When light is irradiated to an electrostatic image developing toner (hereinafter, also simply referred to as toner) or an ink-jet ink (hereinafter simply referred to as ink) containing an image recording composition of the present invention, the stilbene derivative causes a phase transition by photoisomerization to soften and melt. Thereby, it is assumed that good fixability may be imparted to the toner or the ink.

[Electrostatic Image Developing Toner]

The toner according to the present invention comprises at least toner particles, and the toner particles contain the image recording composition of the present invention. In the present invention, "toner" refers to an aggregate of "toner particles". The toner particles contain at least toner mother particles, and the toner particles mean toner mother particles themselves or toner mother particles to which at least an external additive is added.

<Toner Mother Particles>

It is preferable that the toner mother particles according to the present invention contain an image recording composition of the present invention in a binder resin. In addition, the toner mother particles may contain other components such as a colorant, a releasing agent (wax), and a charge controlling agent, when needed.

The production method of the toner mother particles according to the present invention is not particularly limited. Examples of the method include known methods such as: a kneading pulverization method, a suspension polymerization, an emulsion aggregation method, a dissolution suspension method, a polyester extension method, and a dispersion polymerization method. Among these processes, preferred is an emulsion aggregation method in view of the uniformity of the particle size and control of the shape of the toner.

[Binder Resin]

As the binder resin contained in the toner mother particles, a resin generally used as a binder resin constituting the toner may be used without limitation. Specific examples thereof are: a styrene resin, an acrylic resin, a styrene-acrylic resin, a polyester resin, a silicone resin, an olefin resin, an amide resin, and an epoxy resin. These binder resins may be used alone, or they may be used in combination of two or more kinds. Among these resins, it is preferable to use at least one selected from the group consisting of a styrene resin, an acrylic resin, a styrene-acrylic resin, and a polyester resin from the viewpoint of becoming low viscosity when melted, and having a highly sharp melt property. It is more preferable to use a styrene-acrylic resin or a polyester resin. A glass transition temperature ($T_g$) of a binder resin is preferably in the range of 35 to 70° C. from the viewpoint of fixability and heat-resisting storage property. More preferably, it is preferably in the range of 40 to 60° C.

Here, the glass transition temperature of the binder resin is may be adjusted by properly selecting a monomer type used for the synthesis of the binder based on the glass transition temperature of the amorphous resin alone, and by adjusting the copolymerization ratio (mass ratio) and molecular weight of the monomer. For example, taking a styrene-(meth)acrylate copolymer as an example, the glass transition temperature may be lowered by increasing the copolymerization ratio (mass ratio) of n-butyl acrylate having a low glass transition temperature to the entire monomer. Further, the glass transition temperature may be increased by increasing the copolymerization ratio (mass ratio) of styrene having a high glass transition temperature. Further, taking an amorphous polyester resin as an example, the glass transition temperature may be controlled by adjusting the kinds of dicarboxylic acid monomer and diol monomer, and the mixing ratio (mass ratio) of these substances. For example, by making a trifunctional or higher polyfunctional monomer such as trimellitic acid to be copolymerized at an arbitrary polymerization ratio (mass ratio), crosslinking is induced in the molecule or between molecules to increase the glass transition temperature.

(Content Ratio of Stilbene Derivative and Binder Resin)

The binder resin is preferably contained in the following range: "stilbene derivative having a structure represented by the Formula (1):binder resin=5:95 to 80:20 (mass ratio)". Within this range, the light phase transition of the stilbene derivative tends to occur, and the softening rate of the toner by light irradiation tends to be sufficient.

The toner containing the stilbene derivative and the binder resin may have a single-layer structure or a core-shell structure. The type of binder resin used for the core particle and the shell portion of the core-shell structure is not particularly limited.

<Colorant>

As colorants used in the toner mother particles according to the present invention, yellow, magenta, cyan and black dyes may be commonly known materials. Moreover, the colorant (white) which uses inorganic particles, such as titanium dioxide, may also be used. Specific examples of the colorant are as follows.

Examples of a colorant to obtain a black toner are: carbon black, a magnetic material, and iron-titanium complex oxide black. Examples of carbon black that may be used include: channel black, furnace black, acetylene black, thermal black, and lamp black. Examples of a magnetic material that may be used include: ferrite and magnetite.

Examples of a colorant to obtain a yellow toner are: dyes such as C. I. Solvent Yellow 19, 44, 77, 79, 81, 82, 93, 98, 103, 104, 112, and 162; and pigments such as C. I. Pigment Yellows 14, 17, 74, 93, 94, 138, 155, 180, and 185.

Examples of a colorant to obtain a magenta toner are: dyes such as C. I. Solvent Red 1, 49, 52, 58, 63, 111, and 122; and pigments such as C. I. Pigment Red 5, 48:1, 53:1, 57:1, 122, 139, 144, 149, 166, 177, 178, and 222.

Examples of a colorant to obtain a cyan toner are: dyes such as C. I. Solvent Blue 25, 36, 60, 70, 93, and 95; and pigments such as C. I. Pigment Blue 1, 7, 15, 60, 62, 66, 76, and 15:3.

Specific example of the white colorant include: inorganic pigments (e.g., heavy calcium carbonate, light calcium carbonate, titanium dioxide, aluminum hydroxide, titanium white, talc, calcium sulfate, barium sulfate, zinc oxide, magnesium oxide, magnesium carbonate, amorphous silica, colloidal silica, white carbon, kaolin, calcined kaolin, delaminated kaolin, aluminosilicate, sericite, bentonite, and smectite); and organic pigments (e.g., polystyrene resin particles, and urea formalin resin particles). Further, pigments having a hollow structure, for example, hollow resin particles and hollow silica may also be used.

As a colorant for obtaining each color toner, it is possible to use one kind or a combination of two or more kinds for each color. A content ratio of the colorant in the toner is preferably 0.5 to 20 mass %, and more preferably 2 to 10 mass %.

<Releasing Agent>

The toner according to the present invention may contain a releasing agent. A usable releasing agent is not limited in particular. Various known waxes may be used. Examples of a wax are: low molecular weight polypropylene, polyethylene or oxidized low molecular weight polypropylene, polyolefin such as polyethylene, paraffin, and synthetic ester wax. It is particularly preferable to use a synthetic ester wax such as behenyl behenate, glycerin tribehenate, or pentaerythritol tetrabehenate. A content ratio of a releasing agent is preferably in the range of 1 to 30 mass % in the toner, more preferably it is in the range of 3 to 15 mass %.

<Charge Controlling Agent>

The toner according to the present invention may contain a charge controlling agent. The used charge controlling agent is not limited in particular as long as it is a substance that is capable of providing positive or negative charge by a triboelectric charging, and colorless. Various known charge controlling agents that are positively chargeable or negatively chargeable may be used. A content ratio of the charge controlling agent in the toner is preferably in the range of 0.01 to 30 mass %, and more preferably it is in the range of 0.1 to 10 mass % to the total mass of toner particles (100 mass %).

<External Additive>

In order to improve fluidity, charging property, and cleaning property of the toner, an external additive such as fluidity increasing agent and cleaning assisting agent may be added as an after treatment agent to constitute the toner according to the present invention.

Examples of the external additive are: inorganic oxide particles such as silica particles, alumina particles, and titanium oxide particles; inorganic stearic acid compound particles such as aluminum stearate particles and zinc stearate particles; and inorganic particles of inorganic titanium acid compound particles such as strontium titanate particles and zinc titanate particles. These may be used alone, or they may be used in combination of two or more kinds.

From the viewpoint of improving heat-resisting storage stability and environmental stability, these inorganic particles may be subjected to a surface treatment by using a silane coupling agent, a titanium coupling agent, a higher aliphatic acid, or a silicone oil. An addition amount of the external additive in the toner is preferably in the rage of 0.05 to 5 mass % to the total mass of toner particles (100 mass %). More preferably, it is in the rage of 0.1 to 3 mass %.

<Average Particle Size of Toner Particles>

It is preferable that the toner particles of the present invention have an average particle size of 4 to 10 μm, more preferably 6 to 9 μm in volume-based median diameter ($D_{50}$). When the volume-based median diameter ($D_{50}$) is within the above-described range, the transfer efficiency is improved, the image quality of halftone is improved, and the image quality such as fine lines and dots is improved.

In the present invention, the volume-based median diameter ($D_{50}$) of the toner particles is measured and calculated by using measuring equipment composed of a "COULTER COUNTER 3" (Beckman Coulter Inc.) and a computer system installed with data processing software "Software V3.51" (Beckman Coulter Inc.) connected thereto.

In the measuring process, 0.02 g of sample to be measured (the toner particles) is blended in 20 mL of the surfactant solution (for the purpose of dispersing toner particles, for example, a surfactant solution in which a neutral detergent including a surfactant component is diluted by 10 times with pure water), ultrasonic dispersion is performed for 1 minute and a toner particle dispersion liquid is prepared. This toner particle dispersion liquid is poured into a beaker including ISOTON II (manufactured by Beckman Coulter, Inc.) in the sample stand with a pipette until the measurement concentration is 8 mass %.

By setting this content range, it is possible to obtain a reproducible measurement value. Then, the liquid is measured by setting the counter of the particle to be measured to 25,000. The aperture diameter is set to be 50 μm. The frequency count is calculated by dividing the range of the measurement range 1 to 30 μm by 256. The particle size where the accumulated volume counted from the largest size reaches 50% is determined as the volume-based median diameter ($D_{50}$).

A two-component developer may be obtained by mixing the toner according to the present invention with the following carrier particles. The mixing apparatus used for mixing is not particularly limited, and examples thereof include a Nauta mixer, a Double cone mixer and a V-type mixer.

<Carrier Particles>

The carrier particles according to the present invention are made of a magnetic substance. Known carrier particle may be used. Examples of the carrier particles include: coated carrier particles having a carrier core (a core material particle) made of a magnetic substance and a layer of a carrier coat resin (coating material) covering the surface of the carrier core; and resin-dispersed carrier particles in which fine powder of a magnetic substance is dispersed in a resin. Preferred carrier particles are coated carrier particles to reduce the adhesion of the carrier particles onto a photoreceptor.

The core material particle (carrier core) is constituted by a magnetic material, for example, a substance strongly magnetized in the direction of a magnetic field. The magnetic material may be of one kind or more. Examples of such a magnetic substance include ferromagnetic metals, such as iron, nickel, and cobalt; alloys and compounds containing these metals; and alloys demonstrating ferromagnetism after subjected to a heat treatment. The aforesaid magnetic materials may be used alone or they may be used in combination of 2 or more types.

Examples of the ferromagnetic metals, the alloys, and compounds containing these metals include iron, ferrites represented by Formula (a), and magnetite represented by Formula (b). In Formulas (a) and (b), M represents one or more mono or divalent metals selected from the group consisting of Mn, Fe, Ni, Co, Cu, Mg, Zn, Cd, and Li.

MO.Fe$_2$O$_3$  Formula (a):

MFe$_2$O$_4$  Formula (b):

Examples of the alloys demonstrating ferromagnetism after subjected to a heat treatment include Heusler alloys, such as manganese-copper-aluminum and manganese-copper-tin; and chromium dioxide.

Among these core material particles, preferred are a variety of ferrites. This is because the specific gravity of the coated carrier particles is smaller than the specific gravity of the metal constituting the core material particles, and the impact force of stirring in the developing device may be further reduced.

A coated carrier particle may be obtained by coating the surface of the core material particle with a coating material (carrier coat resin). At this time, as the coating material, a known resin used for covering a core material particle may be used. Examples of such resin include: polyolefin resins such as polyethylene and polypropylene; polystyrene resins; polyvinyl resins and polyvinylidene resins such as polymethyl methacrylate; copolymerization resins such as vinyl chloride-vinyl acetate copolymer and styrene-acrylic acid copolymer; silicone resins containing organosiloxane bond or modified resin thereof (e.g., modified resin by alkyd resin, polyester resin, epoxy resin, or polyurethane); fluorine resins such as polyvinyl fluoride; polyamide resins; polyester resins; polyurethane resins; polycarbonate resins; amino resins such as urea-formaldehyde resin; and epoxy resins.

The preferred coating material is a resin having a cycloalkyl group from the viewpoint of reducing the moisture adsorption of the carrier particles and enhancing the adhesion between the coating material and the core particles. Examples of the cycloalkyl group include cyclopropyl, cyclobutyl, cyclopentyl, cyclohexyl, cycloheptyl, cyclooctyl, cyclononyl, and cyclodecyl groups. Among these cycloalkyl groups, preferred is a cyclohexyl group in view of the close adhesion between the coating material and the core material particle (preferably, ferrite particle).

The weight average molecular weight (Mw) of the carrier coat resin as a coating material is in the range of 10,000 to 800,000, and more preferably in the range of 100,000 to 750,000. In addition, the said weight average molecular weight (Mw) may be measured by the method using the GPC apparatus as described in the molecular weight measurement of the crystalline resin of an Example. The content of the structural unit having the cycloalkyl group in the resin is 10 to 90 mass %, for example. The content of the structural unit having the cycloalkyl group in the resin may be determined by pyrolysis-gas chromatography/mass spectrometry (Py-GC/MS) or $^1$H-NMR, for example.

By applying mechanical impact force or heat to the coating material and the core material particles, the coating material may be adhered and fixed to the core material particles, whereby a carrier may be obtained. The volume-based median diameter of the carrier particles is preferably 15 to 100 am, and more preferably 25 to 80 μm.

The median diameter of the carrier particles is measured by a wet method using a laser diffraction type particle size distribution measuring apparatus "HELOS KA" (manufactured by Nippon Laser Co., Ltd.). Specifically, first, an optical system with a focal position of 200 mm is selected, and the measurement time is set to 5 seconds. Then, magnetic particles for measurement are added to a 0.2% aqueous solution of sodium dodecyl sulfate, and dispersed for 3 minutes using an ultrasonic cleaner "US-1" (manufactured by As One Corporation) to prepare a sample dispersion for measurement. A few drops of this sample dispersion are supplied to a laser diffraction type particle size distribution measuring device, and measurement is started when the sample concentration gauge reaches a measurable region. With respect to the obtained particle size distribution, a cumulative distribution is created from the small diameter side with respect to the particle size range (channel), and the particle size at which the cumulative is 50% is defined as the volume average particle size.

[Production Method of Toner]

The method for producing the toner according to the present invention is not particularly limited, and a known method may be adopted, and an emulsion polymerization aggregation method or an emulsion aggregation method may be suitably adopted.

The emulsion aggregation method preferably used as a method for producing a toner according to the present invention has the following steps. The poor solvent is added dropwise to the binder resin solution dissolved in the solvent to perform phase inversion emulsification. Thereafter, by removing the solvent, a resin particle dispersion is obtained, and this resin particle dispersion is mixed with a colorant dispersion and a releasing agent dispersion such as wax. The toner particles are produced by aggregating them to a desired toner particle diameter and further performing fusion between binder resin fine particles to perform shape control. An example of the case of using the emulsion aggregation method as a method of producing the toner of the present invention will be described in the following.

(1A) A step of preparing a dispersion liquid of binder resin particles;

(1B) A step of preparing a dispersion liquid of particles of photoisomerization compound according to the present invention;

(2) An associating step to form associated particles by adding a coagulant to an aqueous medium in which the binder resin particles, the particles of the photoisomerization compound according to the present invention, and colorant particles are contained as necessary are mixed, and while proceeding salt out process, aggregation and fusion are performed;

(3) An aging step to form toner particles by controlling the shape of the associated particles;

(4) A filtrating and washing step of filtering out the toner particles from the aqueous medium and removing surfactant from the toner particles;

(5) A drying step of the washed toner particles; and (6) An adding step of an external additive to the dried toner particles.

The method for producing a toner of the present invention preferably includes the above-described steps. When the toner contains a colorant, it is preferable to carry out a step of preparing a dispersion liquid of colorant particles (1C) prior to the associating step (2).

The binder resin particles containing an internal additive when necessary in the above-described step (2) may be produced so as to have a multilayer structure of two or more layers. For example, when producing binder resin particles having a three-layer structure, they may be produced by carrying out a polymerization reaction for synthesizing binder resin particles in three stages: a first stage polymerization (formation of inner layer), a second stage polymerization (formation of intermediate layer), and a third stage polymerization (formation of outer layer). Here, in the respective polymerization reactions of the first stage polymerization to the third stage polymerization, binder resin particles having a three-layer constitution different in composition may be produced by changing the composition of the polymerizable monomer. Further, for example, in any one of the first stage polymerization to the third stage polymerization, it is possible to form binder resin particles having a three-layer constitution by conducting the synthesis reaction of the binder resin in a state of containing an appropriate internal additive such as a releasing agent.

Thus, the toner mother "particles" may be formed by aggregation, association, and fusion of the colorant "fine particles" and the binder resin "fine particles" such as the amorphous resin "fine particles" and the crystalline resin "fine particles".

<External Additive Treatment Step>

A mechanical mixing apparatus may be used as the external additive mixing treatment (external additive treatment step) on the toner mother particles. The mechanical mixer used may be a Henschel mixer, a Nauta Mixer, or a Turbular mixer. Among these mixers, a Henschel mixer, which is capable of imparting shear force to the particles, may be used to mix the materials for a longer time or with a stirring blade at a higher circumferential speed of rotation. When several kinds of external additives are used, all of the external additives may be mixed with the toner particles in one batch, or several aliquots of the external additives may be mixed with the toner particles.

In the mixing of the external additive, the degree of crush or adhesive strength of the external additive may be controlled with the mechanical mixer through control of the mixing strength or circumferential speed of the stirring blade, the mixing time, or the mixing temperature.

[Image Forming Method]

The image forming method of the present invention is a method having the step of fixing an image by irradiating the image with light. This method comprises the steps of: forming an image on a recording medium using an electrostatic image developing toner or an ink-jet ink, each containing the image recording composition described in any one of the embodiments 1 to 7; and fixing the image formed on the recording medium by irradiating the image with light having a wavelength in the range of 320 to 410 nm.

Hereinafter, an image forming method using the electrostatic image developing toner will be described with reference to a specific example of the electrophotographic image forming method. The electrophotographic image forming method according to the present invention contains the steps of: forming an image on a recording medium by performing the charging step, the exposing step, the developing step, and the transferring step along the rotational direction of the photoreceptor that is rotationally driven; fixing the image formed on the recording medium by irradiating the image with a predetermined light; and removing the residual toner remained on the photoreceptor (cleaning step).

Further, from the viewpoint of further improving the fixability to the recording medium, it is preferable to include a step of pressing the recording medium on which the image is formed with a pressing member after irradiating the image with light. Preferably, the temperature of the pressure member is in the range of 30 to 100° C. In addition, the image may be formed through a known process within the range not inhibiting the effects of the present invention. The recording medium is not particularly limited, and known media may be used. Specifically, for example, in addition to paper such as plain paper and coated paper, various media such as fabric or sheet-like resin, which is capable of fixing a colorant adhering to the surface, may be mentioned. Hereinafter, the charging step, the exposing step, the developing step, the transferring step, the fixing step, the pressing step and the cleaning step will be described in order.

<Charging Step>

In this step, the electrophotographic photoreceptor is charged. The method for charging is not particularly limited. For example, a known method such as a charging roller method in which the electrophotographic photoreceptor is charged by a charging roller may be used.

<Exposing Step>

In this step, an electrostatic latent image is formed on the electrophotographic photoreceptor (an electrostatic latent image carrying member). The electrophotographic photoreceptor is not particularly limited, and examples thereof include drum-shaped members made of an organic photoreceptor such as polysilane or phthalopolymethine.

Formation of the electrostatic latent image is performed by charging the surface of the electrophotographic photoreceptor uniformly with a charging unit and then by imagewise exposing the surface of the electrophotographic photoreceptor with an exposing unit. The electrostatic latent image is an image formed on the surface of the electrophotographic photosensitive member by such a charging unit. The charging unit and the exposing unit are not particularly limited, and those generally used in the electrophotographic method may be used.

<Developing Step>

In this step, a toner image is formed by developing the electrostatic latent image using a toner (generally, a dry type developer including a toner). The formation of the toner image is performed using, for example, a developing unit including a stirrer that frictionally stirs and charges the toner using a dry developer containing the toner, and a rotatable magnet roller.

More specifically, in the developing unit, the toner and the carrier are mixed and stirred so that the toner charged by their friction is retained on the surface of the rotating magnet roller to form a magnetic brush. Since the magnetic roller is disposed at a neighborhood of the electrophotographic photoreceptor, a part of the toner that constitutes the magnetic brush formed on the surface of the magnetic roller is transferred by an electrical attraction force to the surface of the electrophotographic photoreceptor. As a result, the electrostatic latent image is developed with the toner and the toner image is formed on the surface of the electrophotographic photoreceptor.

<Transferring Step>

In this step, the toner image is transferred on the recording medium. The transfer of the toner image on the recording medium is performed by peel charging of the toner image on the recording medium. As a transferring means, for example, a corona transferring device with corona discharge, a transfer belt, or a transfer roller can be used. The transferring step may be performed, for example, using an intermediate transferring member, by first transfer of the toner image on the intermediate transferring member, then by second transfer of the toner image on the recording medium. Alternatively, the toner image formed on the electrophotographic photoreceptor is directly transferred to the recording medium.

<Fixing Step>

The fixing step according to the present invention includes the step of fixing the image (toner image) formed on the recording medium by irradiating the image with light in the wavelength region of 320 to 410 nm. The stilbene derivative contained in the image recording composition according to the present invention preferably has a maximum light absorption wavelength in a wavelength range of about 320 to 410 nm. By irradiating the image with light in a wavelength range of 320 to 410 nm, the effects of the present invention may be exhibited more efficiently, and power consumption may be reduced. Further, when the wavelength of the light to be irradiated is 320 nm or more, it is preferable because the cleavage of a compound such as a resin contained in the toner image hardly occurs.

Further, in the fixing step, it is preferable to irradiate the image with light of a predetermined wavelength regardless of the maximum absorption wavelength of the toner. By irradiating the image with light of a predetermined wavelength, it suppresses occupation of the space in an image forming apparatus, and it is possible to avoid that control becomes complicated. The "maximum emission wavelength" of the light source refers to the emission wavelength at which the emission intensity is maximized among the maximum values of the emission peak (emission band) in the emission spectrum of the light source. Further, the "maximum absorption wavelength" of the toner refers to an absorption wavelength at which the absorption intensity is maximized among the maximum values of the absorption peak (absorption band) in the absorption spectrum of the toner.

(UV Irradiation Unit)

The ultraviolet (UV) irradiation unit irradiates light for melting a compound (stilbene derivative according to the present invention) which undergoes phase transition due to light absorption and contained in the developer. The UV irradiation unit irradiates light having a wavelength in the range of 320 to 410 nm, more preferably in the range of 330 to 390 nm. A light emitting diode (LED) and a laser light source mentioned as examples of a device which constitutes an irradiation device in an ultraviolet irradiation unit which irradiates light in a wavelength range according to the present invention. The irradiation amount of the ultraviolet light in the ultraviolet irradiation unit is preferably in the range of 0.1 to 200 J/cm$^2$, more preferably in the range of 0.5 to 100 J/cm$^2$, still more preferably 1.0 to 50 J/cm$^2$.

Moreover, the method to irradiate light is not specifically limited. Any method may be used as long as it uses a light source that is capable of emitting light in the wavelength range of 320 to 410 nm. For example, a known light source or method such as a method of guiding a light source with an optical fiber may be used, and a method of irradiating light by a light source such as a light emitting diode or a laser light source is particularly preferable. The use of a light emitting diode or a laser light source is preferable because light in a wavelength range of 320 to 410 nm may preferably exhibit a phase transition effect from solid to liquid according to the present invention, and power consumption may be reduced.

Further, the number of light sources for emitting light is not particularly limited. Especially in this process, it is preferable to irradiate light from the all of the light sources with single or multiple light sources to the toner image transferred onto the recording medium regardless of the maximum absorption wavelength of the toner contained in the toner image. The light in the wavelength range of 320 to 410 nm according to the present invention is absorbed by colorants (cyan, magenta, yellow, black, and whit) usually used for toners. Therefore, the effects of the present invention may be exhibited without any problem even if the light is simultaneously irradiated regardless of the number of light sources or the difference in wavelength range. Therefore, even if it has a plurality of light sources, it is possible to emit light from all the light sources, and consequently, it is possible to exhibit the effect even by a simple control that does not require ON/OFF control for each light source.

<Pressing Step>

After the fixing step, it is preferable to include the step of pressing the recording medium on which the image is formed by a pressing member. The method for applying pressure is not particularly limited as long as it applies pressure to the recording medium on which the toner image is formed. The pressure member is preferably in the form of a roller. Further, when the recording sheet passes through the pressure member, the toner image on the recording sheet may be heated.

The pressure applied to the recording medium on which the toner image is formed is not particularly limited, and it is preferably in the range of 0.01 to 1.0 MPa, and more preferably in the range of 0.05 to 0.8 MPa. By pressurizing within this range, the internal air may be more preferably pushed out, and heat transfer may be suitably promoted. Specifically, when the pressure is 0.01 MPa or more, the amount of deformation of the toner may be made sufficient, and the internal air may be pushed out more suitably. When the pressure is 1.0 MPa or less, it is easy to avoid that the gloss of the image becomes too large. In addition, it is preferable to have the process of pressing step after the light irradiating step. Further, the temperature of the pressure member used in the pressing step is preferably in the range of 30 to 100° C. By pressurizing and heating the recording medium on which the toner image is formed, the toner image softened by light irradiation is further softened by this heating, and as a result, the fixability of the toner image to the recording medium is further improved. In addition, as long as it is a member that can heat the toner, it may be a contact type or non-contact type, but a non-contact heating member is preferable because it does not heat until the toner is softened.

The temperature of the pressing member used in the pressing step is raised by heating to make a surface temperature of the toner image to $(T_{g\text{-}min}+20)$ ° C. or higher, more preferably in the range of $(T_{g\text{-}min}+20)$ to $(T_{g\text{-}min}+100)$ ° C., still more preferably $(T_{g\text{-}min}+25)$ to $(T_{g\text{-}min}+80)$ ° C., when the glass transition temperature of the toner having the lowest glass transition temperature among the toners forming the toner image is $T_{g\text{-}min}$. By heating in the said range, an effect may be expressed more reliably. When the temperature is $(T_{g\text{-}min}+20)$ ° C. or higher, the effect of pressurization may be sufficiently obtained, and when the temperature is $(T_{g\text{-}min}+100)$ ° C. or lower, the hot offset may be avoided. The hot offset refers to a phenomenon in which a part of the toner is transferred to a pressing member such as a roller in the fixing step, and the toner layer is divided. The glass transition temperature of the toner may be measured using a differential scanning calorimeter "DSC 8500" (manufactured by Perkin Elmer Co., Ltd.) described later.

The surface temperature of the toner image may be measured by a non-contact temperature sensor. Specifically, for example, non-contact temperature sensors 241a and 241b are installed at positions where the surface temperature of the toner image may be measured (for example, positions where the recording medium is discharged from a pressing member 91). The surface temperature of the toner image may be measured.

<Cleaning Step>

In this step, the developer not used for image formation or left on the developer carrier such as the photoreceptor or the intermediate transfer member is removed from the developer carrier. The cleaning method is not particularly limited, but it is preferable to use a method which uses a blade having a tip disposed in contact with the photoreceptor, and scratching the surface of the photoreceptor.

[Image Forming Apparatus]

An image forming apparatus for performing the image forming method of the present invention will be described. FIG. 1 is a cross-sectional view illustrating an example of the configuration of an image forming apparatus according to the present invention. An image forming apparatus illustrated in FIG. 1 is referred to as a tandem color image forming apparatus, and includes four image forming units (process cartridges) 10Y, 10M, 10C, and 10Bk, an intermediate transferring unit 7 having an endless belt form, a sheet feeding unit 21, and a fixing unit 24. The image forming apparatus further includes a document scanner SC above a main body A of the image forming apparatus.

The image forming unit 10Y forms a yellow image. The image forming unit 10Y includes a drum shape electrophotographic photoreceptor 1Y, with a charging unit 2Y, an exposing unit 3Y, a developing unit 4Y, and a cleaning unit 6Y located around the electrophotographic photoreceptor 1Y. The image forming unit 10Y further includes a primary transfer roller 5Y.

The image forming unit 10M forms a magenta image. The image forming unit 10M includes a drum shape electrophotographic photoreceptor 1M, with a charging unit 2M, an exposing unit 3M, a developing unit 4M, and a cleaning unit 6M located around the electrophotographic photoreceptor 1M. The image forming unit 10M further includes a primary transfer roller 5M.

The image forming unit 10C forms a cyan image. The image forming unit 10C includes a drum shape electrophotographic photoreceptor 1C, with a charging unit 2C, an exposing unit 3C, a developing unit 4C, and a cleaning unit 6C located around the electrophotographic photoreceptor 1C. The image forming unit 10C further includes a primary transfer roller 5C.

The image forming unit 10Bk forms a black image. The image forming unit 10Bk includes a drum shape electrophotographic photoreceptor 1Bk, with a charging unit 2Bk, an exposing unit 3Bk, a developing unit 4Bk, and a cleaning unit 6Bk located around the electrophotographic photoreceptor 1Bk. The image forming unit 10Bk further includes a primary transfer roller 5Bk.

The image forming units 10Y, 10M, 10C, and 10Bk have the same configuration except for the colors of toner images formed on the electrophotographic photoreceptors 1Y, 1M, 1C, and 1Bk. Thus, the following description focuses on the image forming unit 10Y as an example.

In the present embodiment, in the image forming unit 10Y, at least the electrophotographic photoreceptor 1Y, the charging unit 2Y, the developing unit 4Y, and the cleaning unit 6Y are integrated. The charging unit 2Y provides the electrophotographic photoreceptor 1Y with a uniform electric potential to charge the surface of the electrophotographic photoreceptor 1Y (for example, negatively charged). The charging unit 2Y may charge the surface of the electrophotographic photoreceptor 1Y by a non-contact charging method.

The exposing unit 3Y exposes the electrophotographic photoreceptor 1Y which has been given the uniform potential by the charging unit 2Y in response to image signals (yellow) to form an electrostatic latent image corresponding to the yellow image. The exposing unit 3Y includes light emitting devices (LEDs) arrayed in the axial direction of the electrophotographic photoreceptor 1Y and an imaging element (SELFOC (registered trade name)), or includes a laser optical device.

The developing unit 4Y forms a toner image by developing the electrostatic latent image which has been formed by the exposing unit 3Y with an electrostatic latent image developer. Although the electrostatic latent image developer is not specifically limited in the present invention, it is preferable to use a dry type developer.

In the image forming apparatus illustrated in FIG. 1, the electrophotographic photoreceptor 1Y, the charging unit 2Y, the exposing unit 3Y, the developing unit 4Y, and the cleaning unit 6Y are integrated as a process cartridge. This process cartridge may be detachably attached to the apparatus main body A. In addition, at least one of the charging unit 2Y, the exposing unit 3Y, the developing unit 4Y, transferring unit or separator unit, and the cleaning unit 6Y is integrally supported together with the electrophotographic photoreceptor 1Y to constitute a process cartridge. This process cartridge may be detachably attached to the apparatus main body A to form a single image forming unit (image forming unit). The single image forming unit may be detachably attached to the apparatus main body A using a guiding device such as a rail.

A housing 8 includes the image forming units 10Y, 10M, 10C, 10Bk, and the intermediate transferring unit 7. The housing 8 has a structure which may be drawn from the apparatus body A via rails 82L and 82R. In the housing 8, the image forming units 10Y, 10M, 10C, and 10Bk are arranged in cascade in the vertical direction. The intermediate transferring unit 7 is arranged in the left side of the photoreceptor 1Y, 1M, 1C, and 1Bk of FIG. 1. The intermediate transferring unit 7 contains: a rotatable endless belt type intermediate transfer belt 70 that is wound around rollers 71, 72, 73, and 74; first transfer rollers 5Y, 5M, 5C, and 5Bk; and a cleaning unit 6b.

In the following, an image forming method using an image forming apparatus illustrated in FIG. 1 will be described. The color toner images formed in the image forming units 10Y, 10M, 10C, and 10Bk are sequentially transferred onto the rotating intermediate transferring member 70 with the respective first transferring rollers 5Y, 5M, 5C, and 5Bk, to form a synthesized color image on the intermediate transferring member 70.

A recording medium P (plain paper, or a transparent sheet) accommodated in a sheet feeding cassette 20 is fed by the sheet feeding unit 21, and it is transported to a second transferring roller 5b via multiple intermediate rollers 22A, 22B, 22C, and 22D and register rollers 23. The synthesized color image is transferred to the recording medium P by the second transferring roller 5b. Thus, a color image is transferred to the recording medium collectively. After secondary transferring the synthesized color image on the recording medium P, the endless belt type intermediate transfer belt 70 will separate the recording medium P by curvature. The recording medium P is subjected to the fixing treatment by a toner image fixing unit 24 (hereafter, it is called simply a fixing unit), then pinched between discharging rollers 25 and it is conveyed to a sheet receiving tray 26 provided outside of the apparatus. On the other hand, the electrostatic latent image developer (the residual toner) attached on the intermediate transferring member 70 is removed by the cleaning unit 6b.

During image formation, the first transfer roller 5Bk continuously abuts the surface of the electrophotographic photoreceptor 1Bk. On the other hand, the first transfer rollers 5Y, 5M, and 5C abut the surface of the corresponding electrophotographic photoreceptors 1Y, 1M, and 1C only when a color image is formed. Further, the second transfer roller 5b abuts the surface of the endless belt type intermediate transferring member 70 only when the recording medium P passes and the second transfer is performed.

<Fixing Unit>

The fixing unit according to the present invention is a fixing unit used in an image forming apparatus. It includes a light irradiation unit 101 that irradiates light in a wavelength range of 320 to 410 nm to the toner image on the recording medium, and a pressure unit 9 that presses the recording medium on which the toner image is formed.

Figure 2:
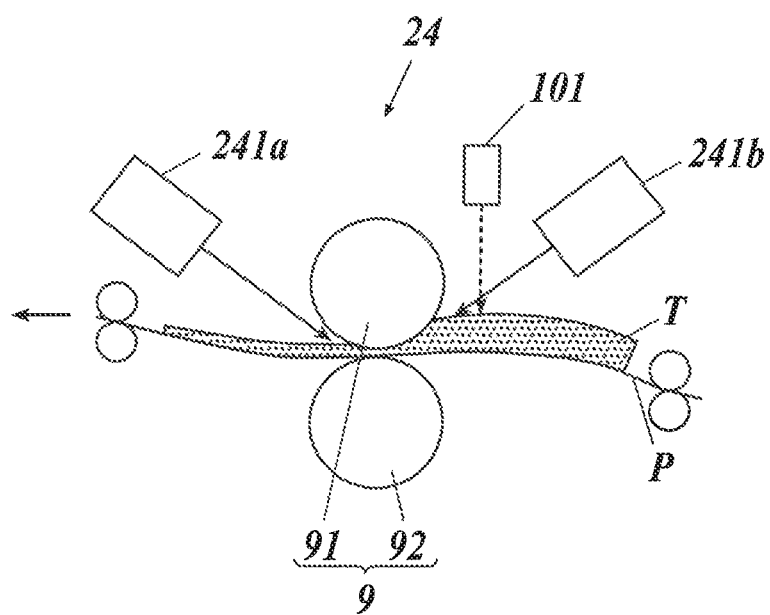
FIG. 2 is an enlarged schematic view of a toner image fixing unit of the image forming apparatus of FIG. 1.

FIG. 2 is an enlarged schematic view of a toner image fixing unit 24 of the image forming apparatus of FIG. 1. In an example illustrated in FIG. 2, the light irradiation unit 101 applies light to a toner image T of a recording medium P. The light irradiation unit 101 is not particularly limited as long as it emits light within a wavelength range of 320 to 410 nm, and any known light irradiator may be used, for example, a light emitting diode or a laser light source may be suitably used.

The light irradiation unit 101 is disposed upstream or downstream of the pressure unit 9 in the direction of conveying the recording medium P, but preferably is disposed upstream of the pressure unit 9 as shown in FIG. 2. The irradiation amount of light in the light irradiation unit 101 is preferably 0.1 to 200 J/cm$^2$, more preferably 0.5 to 100 J/cm$^2$, and still more preferably 1.0 to 50 J/cm$^2$.

<Pressure Unit>

The pressure unit 9 is preferably configured to convey the toner image on the recording medium while pressing the toner image from above and below by rollers such as the pressure members 91 and 92. The method of applying pressure is not particularly limited as long as it can apply pressure to the toner image. For example, one of the pressing members 91 and 92 may be fixed, and the other may press the toner image on the recording medium.

Preferably, the pressure member 91 or 92 is capable of heating the toner image on the recording medium P when the recording medium passes between the pressure members 91 and 92. The method for heating is not particularly limited. For example, the pressure member 91 or 92 may have a lamp-type or induction-type heater incorporated therein. In this case, the fixing unit may further include a thermometer for detecting the temperature of the pressing member 91 or 92, and may control the heating temperature based on the thermometer. By using such a pressure member 91 or 92, it is possible to realize the step of heating while pressing the toner image transferred onto the recording medium.

The temperature of the pressure member 91 or 92 is preferably in the range of 30 to 100° C. By pressurizing and heating the recording medium on which the toner image is formed, the toner image softened by light irradiation is further softened by this heating, and as a result, the fixability of the toner image to the recording medium may be further improved. The recording medium P conveyed to the fixing unit is irradiated with light by the light irradiation unit 101 and pressed by the pressure unit 9, then, the recording medium P is conveyed to a sheet receiving tray 26.

[Ink-Jet Ink]

In the above description, the electrostatic image developing toner containing the image recording composition of the present invention, and the image forming method using the electrostatic image developing toner have been described in detail. The image recording composition of the present invention is capable of similarly exhibiting the effects of the present invention by incorporated in an ink-jet ink.

An ink-jet ink containing the image recording composition of the present invention may be obtained by mixing each of the optional components containing known dispersants and colorants used in ink-jet inks with the image recording composition of the present invention. The ink-jet ink which contains the image recording composition of the present invention is used for the image formation by an ink-jet method. Here, an image formed on a recording medium by an ink-jet method is irradiated with light in a wavelength region of 320 to 410 nm using an ink-jet ink containing the image recording composition of the present invention. The ink is softened and melted by applying thermal energy. In addition, this makes it possible to further improve the fixing strength to the recording medium. The embodiment to which the present invention may be applied is not limited to the above-described embodiment, and may be appropriately changed without departing from the spirit of the present invention. The scope of the present invention should be interpreted by terms of the appended claims.

EXAMPLES

Hereinafter, the present invention will be specifically described by way of examples, but the present invention is not limited thereto. In addition, although the term "part" or "%" is used in Examples, it represents "mass part" or "mass %" unless indicated otherwise.

[Synthesis of Stilbene Derivative]

(Synthesis of Compound 20)

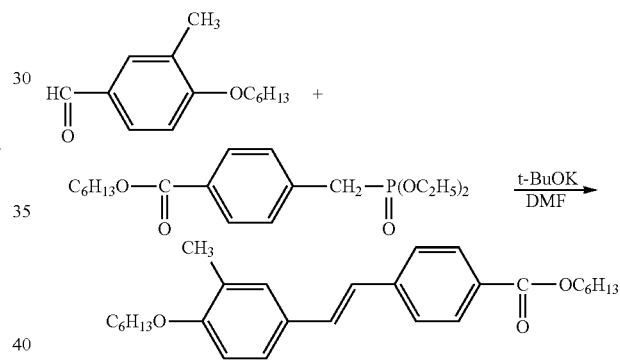

Into a four necked 100 ml flask equipped with a cooling tube, a nitrogen introducing tube, and a temperature sensor, potassium ter-butoxide (t-BuOK) (20.4 g, 18.2 mmol) and 10 ml of dimethylformamide (DMF) were loaded. The mixture was dispersed and stirred while keeping the inner temperature of the flask to be 30° C. In this, a solution of 4-(hexyloxy)-3-methylbenzaldehyde (2.0 g, 9.08 mmol) and hexyl-4-((diethoxyphosphoryl) methyl) benzoate (3.88 g, 10.89 mmol) dissolved in 20 ml of DMF was added dropwise while controlling the inner temperature to 30-45° C. After completion of the dropwise addition, the inner temperature was raised to 60-65° C., and the reaction was continued for 6 hours. After confirming that 4-(hexyloxy)-3-methylbenzaldehyde disappeared by TLC, 100 ml of water was added to the reaction solution to stop the reaction. The target product was extracted with ethyl acetate and washed with water until the washing solution became neutral. The ethyl acetate solution was dried and concentrated to give crude crystals of compound 20. The resultant product was purified with a silica gel column to obtain 2.9 g (yield: 75.6%) of a target compound 20.

Compounds of other stilbene derivatives used in Examples and Comparative Examples were also synthesized in the same manner as preparation of Compound 20 of the stilbene derivative by using the corresponding benzaldehyde and phosphonate. The structures of comparative compounds 1 to 3 used as comparative examples are as follows.

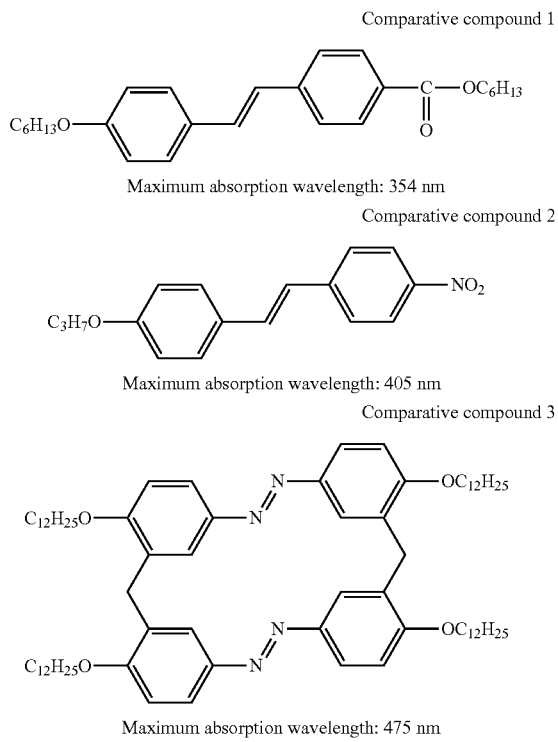

Maximum absorption wavelength: 354 nm

Maximum absorption wavelength: 405 nm

Maximum absorption wavelength: 475 nm

[Preparation of Binder Resin]
<Preparation of Styrene-Acrylic Resin Particle Dispersion Liquid 1 Containing Styrene-Acrylic Resin 1>
(1) First Stage Polymerization Into a reaction vessel equipped with a stirrer, a temperature sensor, a cooling tube, and a nitrogen introducing device, a solution of 8 mass parts of sodium dodecyl sulfate dissolved in 3,000 mass parts of ion-exchanged water was charged. While stirring at a stirring speed of 230 rpm under a nitrogen flow, the inner temperature of the reaction vessel was raised to 80° C. After raising the temperature, a solution of 10 mass parts of potassium persulfate dissolved in 200 mass parts of ion-exchanged water was added thereto, and the liquid temperature was raised again to 80° C. The following polymerizable monomer solution was added dropwise to this solution over 1 hour.

| | |
|---|---|
| Styrene: | 480 mass parts |
| n-Butyl acrylate: | 250 mass parts |
| Methacrylic acid: | 68.0 mass parts |
| n-Octyl 3-mercaptopropionate: | 16.0 mass parts |

After dropping the monomer mixture, the reaction system was heated and stirred at 80° C. for 2 hours to carry out the polymerization. Thus, a styrene-acrylic resin particle dispersion liquid (1A) containing styrene-acrylic resin particles (la) was prepared.
(2) Second Stage Polymerization Into a reaction vessel equipped with a stirrer, a temperature sensor, a cooling tube, and a nitrogen introducing device, a solution of 7 mass parts of sodium polyoxyethylene (2) dodecyl ether sulfate dissolved in 800 mass parts of ion-exchanged water was charged. The solution was heated to 98° C. Then, the following polymerizable monomer solution dissolved at 90° C. was added.

| | |
|---|---|
| Styrene-acrylic resin particle dispersion liquid (1A) prepared above: | 260 mass parts |
| Styrene: | 245 mass parts |
| n-Butyl acrylate: | 120 mass parts |
| n-Octyl 3-mercaptopropionate: | 1.5 mass parts |
| Paraffin wax "HNP-11" (produced by Nippon Seiro Co. Ltd): | 67 mass parts |

The reaction system was mixed and dispersed for 1 hour by using a mechanical disperser with a circulation route "CLEARMIX" (manufactured by M Technique Co. Ltd.) so that a dispersion liquid containing emulsion particles (oil particles) was prepared.

Then, an initiator solution of 6 mass parts of potassium persulfate dissolved in 200 mass parts of ion-exchanged water was added to the dispersion liquid, and the system was heated and stirred at 82° C. for 1 hour to carry out polymerization. Thereby a styrene-acrylic resin particle dispersion liquid (1B) containing styrene-acrylic resin particles (1b) was prepared.
(3) Third Stage Polymerization To the styrene-acrylic resin particle dispersion liquid (1B) as described above was added a solution of 11 mass parts of potassium persulfate dissolved in 400 mass parts of ion-exchanged water. The following polymerizable monomer solution was added to this at a temperature condition of 82° C. over 1 hour.

| | |
|---|---|
| Styrene: | 435 mass parts |
| n-Butyl acrylate: | 130 mass parts |
| Methacrylic acid: | 33 mass parts |
| n-Octyl 3-mercaptopropionate: | 8 mass parts |

After completion of the dropwise addition, polymerization was carried out by heating and stirring at 82° C. for 2 hours, followed by cooling to 28° C., whereby a styrene-acrylic resin particle dispersion liquid 1 containing styrene-acrylic resin 1 was obtained. The glass transition temperature of this styrene-acrylic resin 1 was measured to be 45° C.
<Preparation of Polyester Resin Particle Dispersion Liquid 1 Containing Polyester Resin 1>
(First Stage Polymerization)

Into a 10 L four necked reaction vessel equipped with a nitrogen introduction tube, a dehydration tube, a stirrer and a thermocouple were placed the following.

| | |
|---|---|
| Bisphenol A propylene oxide 2 mol adduct: | 524 mass parts |
| Terephthalic acid: | 105 mass parts |
| Fumaric acid: | 69 mass parts |
| Tin octylate (esterification catalyst): | 2 mass parts |

The polycondensation reaction was carried out at a temperature of 230° C. for 8 hours. Further, the polycondensation reaction was continued at 8 kPa for 1 hour, and then the reaction mixture was cooled to 160° C. to obtain a polyester resin 1. 100 parts by mass of this polyester resin 1 was pulverized with "Lander mill, type: RM" (manufactured by Tokuju Co., Ltd.) and mixed with 638 mass parts of 0.26 mass % aqueous solution of sodium lauryl sulfate prepared in advance. While stirring the mixture, ultrasonic dispersion was performed at a V-LEVEL of 300 μA for 30 minutes using an ultrasonic homogenizer "US-150T" (manufactured by Nippon Seiki Seisakusho Co., Ltd.) to obtain a polyester resin particle dispersion liquid 1. The glass transition temperature of this polyester resin 1 was measured to be 42° C.

[Preparation of Toner 1]

(Preparation of Carbon Black Dispersion Liquid)

11.5 mass parts of sodium n-dodecyl sulfate was dissolved in 1600 mass parts of pure water, and 25 mass parts of carbon black "Morgul L" (manufactured by Cabot Corp.) is gradually added. Then, a carbon black dispersion liquid was prepared by using "CLEARMIX, W-Motion CLM-0.8" (manufactured by M Technique Co., Ltd.).

(Preparation of Stilbene Derivative Particle Dispersion Liquid 1)

80 mass parts of dichloromethane and 20 mass parts of the compound 11 of the stilbene derivative were mixed and stirred while heating at 50° C. to obtain a liquid containing the compound 11 of the stilbene derivative. To 100 mass parts of this solution was added a mixed solution of 99.5 mass parts of distilled water warmed to 50° C. and 0.5 mass parts of 20 mass % aqueous solution of sodium dodecylbenzene sulfonate. Then, the mixture was stirred at 16000 rpm for 20 minutes and emulsified by a homogenizer (manufactured by Heidolph Co.) equipped with a shaft generator 18F to obtain a stilbene derivative emulsion 1.

The obtained stilbene derivative emulsion 1 was charged into a separable flask, and heated and stirred at 40° C. for 90 minutes while introducing nitrogen into the gas phase to remove the organic solvent, to obtain a stilbene derivative particle dispersion liquid.

(Aggregation and Fusion)

504 mass parts (solid content) of the aforesaid styrene-acrylic resin particle dispersion liquid 1, 216 mass parts (solid content) of the aforesaid stilbene derivative particle dispersion liquid, 900 mass parts of ion-exchanged water, and 70 mass parts (solid content) of the aforesaid carbon black dispersion liquid were loaded into a reaction vessel equipped with a stirrer, a temperature sensor, and a cooling tube. The temperature in the vessel was maintained at 30° C. and the pH was adjusted to 10 by addition of 5 mol/L aqueous sodium hydroxide solution.

Next, an aqueous solution in which 2 mass parts of magnesium chloride hexahydrate was dissolved in 1000 mass parts of ion-exchanged water was added dropwise over 10 minutes while stirring. Thereafter, the temperature was raised, and the system was heated to 70° C. for 60 minutes, and the particle growth reaction was continued while maintaining 70° C. The particle size of the aggregated particles was measured by using a "Coulter Multisizer 3" (Beckman Coulter Inc.)". When the volume-based median diameter ($D_{50}$) reached 6.5 μm, an aqueous solution of 190 mass parts of sodium chloride dissolved in 760 mass parts of ion-exchanged water was added to terminate the particle growth. After stirring at 70° C. for 1 hour, the temperature was further raised, and by heating and stirring at 75° C., fusion of particles was advanced. Thereafter, the dispersion was cooled to 30° C. to obtain a dispersion liquid of toner particles.

The resulting dispersion liquid of the toner particles was subjected to solid-liquid separation with a centrifuge to form a wet cake of toner particles. The obtained wet cake was washed with ion-exchanged water at 35° C. with the same centrifuge until the electric conductivity of the filtrate reached 5 μS/cm. Thereafter, it was transferred to a flash jet dryer (manufactured by Seishin Enterprise Co. Ltd.) and dried until the water content reached 0.5 mass %. Thereby a toner 1 was prepared.

[Preparation of Toners 2 to 18 and 20 to 23]

Toners 2 to 18 and 20 to 23 were prepared in the same manner as preparation of the toner 1 except that the types of the stilbene derivative and the comparative compound, and the type and amount of the binder resin were changed to those described in Table II below.

In the preparation of the toner 20, in the preparation of "the styrene-acrylic resin particle dispersion liquid 1", the dispersion liquid obtained by performing the second stage polymerization and the third stage polymerization by using the polyester resin particle dispersion liquid 1 was used in place of the styrene-acrylic resin particle dispersion liquid 1. Further, in the preparation of the toner 23, an azobenzene derivative (comparative compound 3) was used as a comparative compound.

[Preparation of Toner 19]

The compound 8 of the stilbene derivative was roughly crushed by a hammer mill to a particle size of 1 mm or less, and then finely pulverized using a collision type air flow crusher using a high pressure gas to obtain a pulverized product of stilbene derivative. Next, the fine powder and the coarse powder were simultaneously classified and removed using a crusher to obtain a toner 19.

[Preparation of Developer]

9.5 g of iron powder with a volume-based median diameter of 70 μm and 0.5 g of each toner were placed in a 20 mL glass container, and the mixture was shaken at a swing angle of 45 degrees and an arm of 50 cm 200 times per minute for 20 minutes. Thus, a developer was produced for each toner.

<<Evaluation Method>>

[Evaluation: Fixability]

The fixability was evaluated as follows using a developer prepared using each toner and the following image forming apparatuses 1 to 3 having different fixing conditions.

The fixability test was performed under normal temperature and normal humidity environment (temperature 20° C., humidity 50% RH) using the developer obtained above. The developer was arranged to be slid by a magnetic force between a pair of parallel flat plate (aluminum) electrodes with a developer on one side and a plain paper (basis weight: 64 g/m$^2$) on the other side. The gap between the electrodes was made to be 0.5 mm. The toner was developed under the condition that the DC bias and the AC bias were such that the toner adhesion amount was 3 g/m$^2$, thereby a toner layer was formed on the surface of the paper, and a printed matter fixed by each fixing device was obtained. An image of 1 cm square of this printed matter was rubbed ten times with a pressure of 50 kPa with "JK Wiper (registered trademark)" (manufactured by Nippon Paper Industries Co., Ltd.), and the fixing rate of the image was evaluated. When the fixing rate of the image was 50% or more, it was classified to pass the examination.

The fixing rate of the image was the following value. The density of the image immediately after printing and the density of the image after rubbing were measured with a reflection densitometer "RD-918" (manufactured by Sakata Inx Engineering Co., Ltd.). The reflection density of the solid image after rubbing was divided by the reflection density of the solid image after printing to obtain a quotient. The fixing rate of the image was obtained from this quotient expressed as a percentage.

(Fixing Conditions)

In the copying apparatus "bizhub PRO C6501" (Konica Minolta Co., Ltd.) having a charging unit, an exposing unit, a developing unit, and a transfer unit (transfer roller) as indicated in FIG. 1, the fixing unit indicated in FIG. 2 was modified. The following evaluation was performed using the fixing unit having the following three different fixing conditions (Nos. 1 to 3).

No. 1: Without a pressure unit 9 of FIG. 2, a wavelength of ultraviolet light irradiated from the light irradiation unit 101 is 365 nm (light source: LED light source with an emission wavelength of 365 nm±10 nm), and the irradiation amount is 10 J/cm².

No. 2: In the fixing unit of No. 1, pressure members (pressure rollers) 91 and 92 as shown in FIGS. 1 and 2 are further included. Pressurization is performed at a pressure of 0.2 MPa by sandwiching the portion on which the toner image is formed from both sides. The temperature of the pressure members 91 and 92 is 20° C. The light source and the irradiation amount of the light irradiation unit 101 are the same as No. 1.

No. 3: Using the same fixing unit of No. 2, except that the pressure members (pressure rollers) 91 and 92 are heated to 80° C.

[Evaluation: Light Resistance]

The solid image sample was irradiated with a xenon fade meter (70,000 lux) for 10 days, and the light resistance was evaluated by the change of the reflection density before and after the irradiation. The image density before and after irradiation with a xenon fade meter was measured using a "Spectrocolorimeter CM-3700A (manufactured by Konica Minolta Co., Ltd.)" and ranked according to the following evaluation criteria.

○: Density difference of less than 0.1

Δ: Density difference of 0.1 or more, and less than 0.15

X: Density difference of 0.15 or more

The constitution of each toner, the fixing conditions and the evaluation results are listed in the following Table II.

TABLE II

| | Toner No. | Compound No. | $R_1$ | $R_2$ | $R_3$ | $R_4$ | $R_5$ | $R_6$ | $R_7$ | $R_8$ | $R_9$ | $R_{10}$ | Binder resin | (Stilbene derivative)/ (Binder resin) (mass ratio) | Fixing condition No. | Fixing ration (%) | Light resistance |
|---|---|---|---|---|---|---|---|---|---|---|---|---|---|---|---|---|---|
| Example 1 | 1 | 11 | $OC_4H_9$ | $COC_6H_{13}$ | H | H | H | H | H | $CH_3$ | H | H | *1 | 30/70 | 1 | 92 | ○ |
| Example 2 | 2 | 10 | $OC_4H_9$ | $COC_4H_9$ | $C_3C_7$ | H | H | H | H | H | H | H | *1 | 30/70 | 1 | 90 | ○ |
| Example 3 | 3 | 13 | $OC_4H_9$ | $COOC_8H_{17}$ | H | H | H | H | H | $C_4C_9$ | H | H | *1 | 30/70 | 1 | 95 | ○ |
| Example 4 | 4 | 8 | $OC_3H_7$ | $COOC_4H_9$ | $C_2C_5$ | H | H | H | H | H | H | H | *1 | 30/70 | 1 | 90 | ○ |
| Example 5 | 5 | 12 | $OC_4H_9$ | $COOC_4H_9$ | $C_2C_5$ | H | H | H | H | H | H | H | *1 | 30/70 | 1 | 90 | ○ |
| Example 6 | 6 | 15 | $OC_5H_{11}$ | $COOCH_3$ | $C_4C_9$ | H | H | H | $C_4C_9$ | H | H | H | *1 | 30/70 | 1 | 93 | ○ |
| Example 7 | 7 | 19 | $OC_6H_{13}$ | $COOC_8H_{17}$ | H | H | H | H | $CH_3$ | $CH_3$ | H | H | *1 | 30/70 | 1 | 92 | ○ |
| Example 8 | 8 | 28 | $OC_{10}H_{21}$ | $COC_6H_{13}$ | H | H | H | H | $CH_3$ | $CH_3$ | H | H | *1 | 30/70 | 1 | 90 | ○ |
| Example 9 | 9 | 20 | $OC_6H_{13}$ | $COOC_6H_{13}$ | $CH_3$ | H | H | H | H | H | H | H | *1 | 30/70 | 1 | 95 | ○ |
| Example 10 | 10 | 29 | $OC_{10}H_{21}$ | $COOCH_3$ | $C_4C_9$ | $C_4C_9$ | H | H | H | H | H | H | *1 | 30/70 | 1 | 76 | Δ |
| Example 11 | 11 | 3 | $OC_2H_5$ | $COC_6H_{13}$ | H | H | H | H | $CH_3$ | $CH_3$ | H | H | *1 | 30/70 | 1 | 86 | Δ |
| Example 12 | 12 | 14 | $OC_5H_{11}$ | $COC_6H_{13}$ | H | H | H | H | $CH_3$ | H | H | H | *1 | 30/70 | 1 | 91 | ○ |
| Example 13 | 13 | 16 | $OC_5H_{11}$ | $COOC_4H_9$ | $C_2C_5$ | H | H | H | H | H | H | H | *1 | 30/70 | 1 | 79 | ○ |
| Example 14 | 14 | 18 | $OC_6H_{13}$ | $COC_2H_5$ | H | H | H | H | $C_2C_5$ | H | H | H | *1 | 30/70 | 1 | 80 | Δ |
| Example 15 | 15 | 8 | $OC_3H_7$ | $COOC_4H_9$ | $C_2C_5$ | H | H | H | H | H | H | H | *1 | 30/70 | 1 | 70 | ○ |
| Example 16 | 16 | 8 | $OC_3H_7$ | $COOC_4H_9$ | $C_2C_5$ | H | H | H | H | H | H | H | *1 | 5/95 | 1 | 80 | ○ |
| Example 17 | 17 | 8 | $OC_3H_7$ | $COOC_4H_9$ | $C_2C_5$ | H | H | H | H | H | H | H | *1 | 10/90 | 1 | 86 | ○ |
| Example 18 | 18 | 8 | $OC_3H_7$ | $COOC_4H_9$ | $C_2C_5$ | H | H | H | H | H | H | H | *1 | 80/20 | 1 | 74 | ○ |
| Example 19 | 19 | 8 | $OC_3H_7$ | $COOC_4H_9$ | $C_2C_5$ | H | H | H | H | H | H | H | — | 100/0 | 1 | 65 | ○ |
| Example 20 | 20 | 8 | $OC_3H_7$ | $COOC_4H_9$ | $C_2C_5$ | H | H | H | H | H | H | H | *2 | 30/70 | 1 | 85 | ○ |
| Example 21 | 9 | 20 | $OC_6H_{13}$ | $COOC_6H_{13}$ | $CH_3$ | H | H | H | H | H | H | H | *1 | 30/70 | 2 | 96 | ○ |
| Example 22 | 9 | 20 | $OC_6H_{13}$ | $COOC_6H_{13}$ | $CH_3$ | H | H | H | H | H | H | H | *1 | 30/70 | 3 | 98 | ○ |
| Comparative example 1 | 21 | Comparative compound 1 | $OC_6H_{13}$ | $COOC_6H_{13}$ | H | H | H | H | H | H | H | H | *1 | 30/70 | 1 | 43 | Δ |
| Comparative example 2 | 22 | Comparative compound 2 | $OC_3H_7$ | *1 | H | H | H | H | H | H | H | H | *1 | 30/70 | 3 | 18 | x |
| Comparative example 3 | 23 | Comparative compound 3 | Azobenzene derivative | | | | | | | | | | *1 | 30/70 | 1 | 20 | x |

*1: Styrene-acrylic resin
*2: Polyester resin

As indicated in Table II, it was found that the electrostatic image developing toner containing the image recording composition of the present invention exhibited excellent fixability compared to the comparative example. Further, it was found out that light resistance was also excellent.

What is claimed is:

1. An image recording composition used for an electrostatic image developing toner or an ink-jet ink, comprising a photoisomerization compound which is a stilbene derivative having a structure represented by Formula (1),

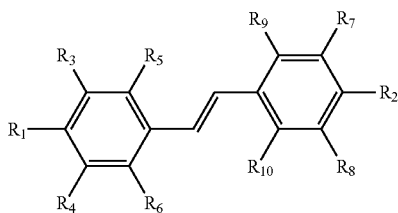

Formula (1)

wherein $R_1$ represents an electron donating group; $R_2$ represents an electron withdrawing group; $R_3$ to $R_{10}$ each independently represent a hydrogen atom or an alkyl group which may have a branch, provided that at least one of $R_3$ to $R_{10}$ represents an alkyl group which may have a branch.

2. The image recording composition described in claim 1, wherein $R_1$ in Formula (1) represents an alkoxy group having 1 to 12 carbon atoms.

3. The image recording composition described in claim 1, wherein $R_1$ in Formula (1) represents an alkoxy group having 2 to 8 carbon atoms.

4. The image recording composition described in claim 1, wherein $R_2$ in Formula (1) represents an alkoxycarbonyl group or an acyl group, and a number of carbon atoms in an alkyl chain contained in the alkoxycarbonyl group or the acyl group is 1 to 12.

5. The image recording composition described in claim 1, wherein $R_2$ in Formula (1) represents an alkoxycarbonyl group or an acyl group, and a number of carbon atoms in an alkyl chain contained in the alkoxycarbonyl group or the acyl group is 4 to 8.

6. The image recording composition described in claim 1, wherein $R_2$ in Formula (1) represents an alkoxycarbonyl group, and a number of carbon atoms in an alkyl chain contained in the alkoxycarbonyl group is 4 to 8.

7. The image recording composition described in claim 1, wherein at least one of $R_3$ to $R_{10}$ in Formula (1) represents an alkyl group having 1 to 4 carbon atom number which may have a branch.

8. The image recording composition described in claim 1, wherein the stilbene derivative has a maximum light absorption wavelength in the range of 320 to 410 nm.

9. An electrostatic image developing toner including toner particles, wherein the toner particles contain the image recording composition described in claim 1.

10. The electrostatic image developing toner described in claim 9, wherein the toner particles contain a binder resin.

11. The electrostatic image developing toner described in claim 10, wherein the binder resin contains a styrene-acrylic resin or a polyester resin.

12. The electrostatic image developing toner described in claim 9, wherein the toner particles contain a colorant.

13. An image forming method comprising the steps of:
    forming an image on a recording medium using an electrostatic image developing toner or an ink-jet ink, each containing the image recording composition described in claim 1; and
    fixing the image formed on the recording medium by irradiating the image with light having a wavelength in the range of 320 to 410 nm.

14. The image forming method described in claim 13, further including a step of pressing the recording medium on which the image is formed by a pressing member after the image is irradiated with the light.

15. The image forming method described in claim 14, wherein a temperature of the pressing member is in the range of 30 to 100° C.

* * * * *